US009237209B2

(12) United States Patent
Proctor, Jr.

(10) Patent No.: US 9,237,209 B2
(45) Date of Patent: Jan. 12, 2016

(54) TIME-SLOTTED DATA PACKETS WITH A PREAMBLE (71) Applicant: Intel Corporation, Santa Clara, CA (US)

(72) Inventor: James A. Proctor, Jr., Indialantic, FL (US)

(73) Assignee: Intel Corporation, Santa Clara, CA (US)

( * ) Notice: Subject to any disclaimer, the term of this patent is extended or adjusted under 35 U.S.C. 154(b) by 219 days.

(21) Appl. No.: 13/891,427

(22) Filed: May 10, 2013

(65) Prior Publication Data
US 2013/0242950 A1 Sep. 19, 2013

Related U.S. Application Data (63) Continuation of application No. 13/026,865, filed on Feb. 14, 2011, now Pat. No. 8,467,353, which is a continuation of application No. 11/189,529, filed on Jul. 26, 2005, now Pat. No. 7,889,702, which is a
(Continued)

(51) Int. Cl.
*H04L 12/28* (2006.01)
*H04L 29/06* (2006.01)
(Continued)

(52) U.S. Cl.
CPC .............. *H04L 69/22* (2013.01); *H04L 1/0001* (2013.01); *H04L 1/0083* (2013.01); *H04W 72/04* (2013.01); *H04W 72/0446* (2013.01); *H04L 2001/0093* (2013.01); *H04W 28/18* (2013.01)

(58) Field of Classification Search
CPC ................ H04L 1/0001; H04L 1/0083; H04L 2001/0093; H04W 72/04; H04W 28/18

USPC ......................................................... 370/335
See application file for complete search history.

(56) References Cited

U.S. PATENT DOCUMENTS 5,371,780 A 12/1994 Amitay
5,442,625 A 8/1995 Gitlin et al.
(Continued)

FOREIGN PATENT DOCUMENTS

EP 0719062 B1 5/2013
WO 9608934 A2 3/1996
(Continued)

OTHER PUBLICATIONS

3COM, "What's New in Wireless LANs: The IEEE 802.11b Standard", http://www.3com.com/technology/tech_net/white_papers/503072a.html, Mar. 20, 2001, 15 pages.
(Continued)

*Primary Examiner* — Melvin Marcelo
(74) *Attorney, Agent, or Firm* — Stoel Rives LLP (57) ABSTRACT A method and apparatus are used to support the transmission of data to a user over multiple allocated data channels. Data packets are transmitted in timeslots of the allocated data channels to corresponding target receivers without the need for explicitly assigning particular time-slots to a target user well in advance of transmitting any data packets in the timeslots. Instead, each data packet transmitted in a time-slot includes a header label or preamble indicating to which of multiple possible receivers a data packet is directed. The preamble also preferably includes decoding information indicating how a corresponding data payload of the data packet is to be processed for recapturing transmitted raw data.

17 Claims, 6 Drawing Sheets

Related U.S. Application Data continuation of application No. 09/845,240, filed on Apr. 30, 2001, now Pat. No. 6,925,070.

(60) Provisional application No. 60/221,751, filed on Jul. 31, 2000.

(51) Int. Cl.
*H04L 1/00* (2006.01)
*H04W 72/04* (2009.01)
*H04W 28/18* (2009.01)

(56) References Cited

U.S. PATENT DOCUMENTS

| | | | |
|---|---|---|---|
| 5,563,883 | A | 10/1996 | Cheng |
| 5,585,850 | A | 12/1996 | Schwaller |
| 5,592,470 | A | 1/1997 | Rudrapatna et al. |
| 5,722,043 | A | 2/1998 | Rappaport et al. |
| 5,742,592 | A | 4/1998 | Scholefield et al. |
| 5,752,193 | A | 5/1998 | Scholefield et al. |
| 5,790,551 | A | 8/1998 | Chan |
| 5,793,744 | A | 8/1998 | Kanerva et al. |
| 5,826,169 | A | 10/1998 | Natarajan |
| 5,862,485 | A | 1/1999 | Linneweh, Jr. et al. |
| 5,896,376 | A | 4/1999 | Alperovich et al. |
| 5,956,643 | A | 9/1999 | Benveniste |
| 6,005,855 | A | 12/1999 | Zehavi et al. |
| 6,154,486 | A | 11/2000 | Scott et al. |
| 6,198,734 | B1 | 3/2001 | Edwards et al. |
| 6,567,397 | B1 * | 5/2003 | Campana et al. ............ 370/349 |
| 6,574,211 | B2 | 6/2003 | Padovani et al. |
| 6,917,603 | B2 | 7/2005 | Strawczynski et al. |
| 6,925,070 | B2 | 8/2005 | Proctor, Jr. |
| 7,362,735 | B2 | 4/2008 | Mantha |
| 2003/0002495 | A1 | 1/2003 | Shahar et al. |

FOREIGN PATENT DOCUMENTS

| | | | |
|---|---|---|---|
| WO | 9726726 A1 | 7/1997 | |
| WO | WO9725788 A1 * | 7/1997 | ............ H04B 10/10 |

OTHER PUBLICATIONS

3G TS 25.201, "Technical Specification Group Radio Access Network; Physical layer-General description (Release 1999)", V3.1.0, Jun. 2000, 14 pages.
3G TS 25.211, "Technical Specification Group Radio Access Network; Physical channels and mapping of transport channels onto physical channels (FDD) (Release 1999)", V3.3.0, Jun. 2000, 42 pages.
3G TS 25.212, "Technical Specification Group Radio Access Network; Multiplexing and channel coding (FDD) (Release 1999)", V3.3.0, Jun. 2000, 62 pages.
3G TS 25.213, "Technical Specification Group Radio Access Network; Spreading and modulation (FDD) (Release 1999)", V3.3.0, Jun. 2000, 26 pages.
3G TS 25.213, "Technical Specification Group Radio Access Network; Spreading and modulation (FDD) (Release 4)", V4.0.0, Mar. 2001, 26 pages.
3G TS 25.214, "Technical Specification Group Radio Acces Network; Physical layer procedures (FDD) (Release 1999)", V3.3.0, Jun. 2000, 44 pages.
3G TS 25.301, "Technical Specification Group Radio Access Network; Radio Interface Protocol Architecture (Release 1999)", V3.5.0, Jun. 2000, 44 pages.
3GPP 2 C.S0024, "cdma2000 High Rate Packet Data Air Interface Specification", Version 2.0, Oct. 27, 2000, 441 Pages.
3GPP TS 25.201, "Technical Specification Group Radio Access Network; Physical layer—General description (Release 4)", V.4.0.0, Mar. 2001, 15 pages.
3GPP TS 25.211, "Technical Specification Group Radio Access Network; Physical channels and mapping of transport channels onto physical channel (FDD) (Release 4)", V.4.0.0, Mar. 2001, 45 pages.
3GPP TS 25.211, "Technical Specification Group Radio Access Network; Physical channels and mapping of transport channels onto physical channels (FDD) (Release 1999)", V3.6.0, Mar. 2001, 45 pages.
3GPP TS 25.212, "Techincal Specification Group Radio Access Network; Multiplexing and channel coding (FDD) (Release 4)", V.4.0.0, Dec. 2000, 62 pages.
3GPP TS 25.212, "Technical Specification Group Radio Access Network; Multiplexing and channel coding (FDD) (Release 1999)", V3.4.0, Sep. 2000, 62 pages.
3GPP TS 25.213, "Technical Specification Group Radio Access Network; Spreading and modulation (FDD) (Release 1999)", V3.5.0, Mar. 2001, 26 pages.
3GPP TS 25.214, "Technical Specification Group Radio Access Network; Physical layer procedures (FDD) (Release 1999)", V3.6.0, Mar. 2001, 47 pages.
3GPP TS 25.214, "Technical Specification Group Radio Access Network; Physical layer procedures (FDD) (Release 4)", V.4.0.0, Mar. 2001, 47 pages.
3GPP TS 25.301, "Technical Specification Group Radio Access Network; Radio Interface Protocol Architecture (Release 1999)", V3.7.0, Mar. 2001, 39 pages.
3GPP TS 25.301, "Technical Specification Group Radio Access Network; Radio Interface Protocol Architecture (Release 4)", V.4.0.0, Mar. 2001, 39 pages.
3GPP TS 25.306, "Technical Specification Group Radio Access Network; UE Radio Access Capabilities (Release 1999)", V3.1.0, Mar. 2001, 40 pages.
3GPP TS 25.306, "Technical Specification Group Radio Access Network; UE Radio Access Capabilities (Release 4)", V.4.0.0, Mar. 2001, 21 pages.
Casio, et al., "Proposed cdma2000 Companion High Data Rate (HDR) Standard", 3GPP2-C00-20000327-, Mar. 27, 2000, 313 Pages.
Petrick, "IEEE 802.11b—Wireless Ethernet", CSD Jun. 2000 Standards & Protocols (http://www.csdmag.com/main/2000/06/0006stand.htm), Jun. 2001, 7 Pages.

* cited by examiner

| | | | | | | | | | |
|---|---|---|---|---|---|---|---|---|---|
| CH #1 | USER 1 | 1 | 2 | ALL | 2 | 2 | 2 | 1 | 2 | ← 400-1 |
| CH #2 | 3 | 1 | 1 | 5 | 2 | 2 | 1 | 1 | 1 | ← 400-2 |
| CH #3 | 3 | 3 | 1 | 1 | 2 | 2 | 1 | 1 | 1 | ← 400-3 |
| ... | | | | | | | | | | |
| CH #N | 3 | ALL | 3 | 1 | 2 | 2 | 2 | 1 | 2 | ← 400-N |

TIME-SLOTTED DATA PACKETS WITH A PREAMBLE

RELATED APPLICATIONS

This application is a continuation of U.S. patent application Ser. No. 13/026,865 filed Feb. 14, 2011, which is a continuation of U.S. patent application Ser. No. 11/189,529 filed Jul. 26, 2005 which is issued on Feb. 15, 2011 as U.S. Pat. No. 7,889,702, which is a continuation of U.S. patent application Ser. No. 09/845,240, filed Apr. 30, 2001 which issued on Aug. 2, 2005 as U.S. Pat. No. 6,925,070, which claims the benefit of U.S. Provisional Application Ser. No. 60/221,751 filed on Jul. 31, 2000, the contents of which are herein incorporated by reference.

BACKGROUND OF THE INVENTION

Continued growth in the electronics and computer industries, and indeed growth in the economy in general, is increasingly attributed to the demand for access to the Internet and myriad of services and features that it provides. The proliferation in the use of computing equipment, both of the conventional desk top variety as well as of the portable variety, including laptop computers, hand-held Personal Digital Assistants (PDAs), Internet enabled cellular telephones and other access devices have resulted in a corresponding increase in demand for network infrastructure.

The access points into the Internet are, however, mostly provided via communication systems that were originally intended for carrying non-data traffic. For example, the Public Switched Telephone Network (PSTN) is still heavily used as a dial-up access point for many home and personal users. Although there various standards are emerging that provide higher speed access points, these technologies, as well as older high speed technologies such as TI and/or fractional TI services still make use of the telephone network. The telephone network was, unfortunately, optimized to carry Voice traffic as opposed to data traffic. In particular, these networks were intended to support continuous analog communications, as compared to the digital communication protocols needed for Internet packet-oriented communications.

For example, Voice grade services typically require access to a communication channel bandwidth of approximately 3 kilohertz (kHz). While techniques do exist for communicating data over such radio channels at a rate of 9.6 kilobits per second (kbps), such low bandwidth channels do not lend themselves directly to efficient transmission of data at the typical rates of 56.6 kbps or higher that are now commonly expected.

In addition, the very nature of Internet traffic itself is different from the nature of voice traffic. Voice communication requires a continuous duplex connection, that is, a user at one end of a connection expects to be able to transmit to and receive data from a user at the other end of a connection continuously, while at the same the user at the other end is also transmitting and receiving.

Usage patterns of the Internet are also quite different from voice communications. For example, consider that access to Web pages over the Internet in general is burst-oriented. Typically, the user of a remote client computer first specifies the address of a Web page to a browser program. The browser program at the client computer then sends the request as a Transmission Control Protocol (TCP)/Internet Protocol (IP) message packet, which is typically about 1000 bytes in length, to a network Web server. The Web server then responds by sending the content of the requested Web page, which may include anywhere from approximately 10 kilobytes to several megabytes of text, image, audio or video data. Because of delays inherent in the network, and because the Internet is such a vast interconnected mesh of networks, users can experience delays of several seconds or more for the requested web page to be routed to them. The user may thereafter spend several seconds or even several minutes reading the contents of the page before specifying a next page to be downloaded.

The result is that a typical Internet connection remains idle for a relatively long period of time. However, once a request is made, the user expects the information to be transmitted to the client at a relatively rapid rate. An additional difficulty is provided in wireless access systems in that there are typically many more potential users or subscribers than the available number of physical radio channels. Therefore, making wireless channels available only on an instantaneous "as needed" basis makes sense, and indeed is a requirement if wireless data transfer services are to efficiently operate. Thus, dynamic traffic channel allocation schemes are one way to increase the efficiency of wireless data communication systems in an effort to more efficiently utilize available channel resources.

Some type of demand-based multiple access technique is therefore typically required to make maximum use of the available wireless channels. Multiple access IS often provided in the physical layer, such as by Frequency Division Multiple Access (FDMA) or by schemes that manipulate the radio frequency signal such as Time Division Multiple Access (TDMA) or Code Division Multiple Access (CDMA). In any event, the nature of the radio spectrum is such that it is a medium that is expected to be shared. This is quite dissimilar to the traditional environment for data transmission, in which a wired medium such as a telephone line or network cable is relatively inexpensive to obtain and to keep open all the time.

SUMMARY OF THE INVENTION

The present invention is generally directed towards a system and method for communicating data over shared channel resources. In an illustrative embodiment, data packets transmitted in time slots of the shared channels each include a header label or preamble including information associated with the data packet. Information in the preamble of a data packet is optionally processed at a potential target receiver to determine to which of multiple possible receivers a data packet is directed.

More particularly, certain aspects of the present invention can be used for communicating data to at least one of a plurality of receivers in a wireless communication system. This is achieved by allocating at least one channel of multiple available channels to carry time-slotted data packets to target receiver units on an as-needed basis. A data packet transmitted in a time-slot of an allocated channel can include preamble information indicating to which receiver a data packet is directed and a modulation type of a following portion the data packet. Accordingly, short-burst, high-speed data transfers are achieved by simultaneously sending multiple data packets to a particular receiver over multiple channels.

Additional data such as address information is optionally included in a preamble so that a target receiver to which the data packet is directed can further process and properly decode a corresponding data packet. Alternatively, a receiver can be assigned use of a portion of an allocated channel for receiving data. For instance, a target receiver can be assigned use of one or more time slots for receiving data on an allocated channel.

Each data packet potentially includes a data payload that is modulated at a rate independent of a modulation type used in transmitting the preamble, i.e., the data payload and preamble of a data packet can be modulated at a same or different rate.

In one application, a type of modulation used in transmitting the data payload depends on observed link quality parameters of the wireless communication system. For example, in the presence of very low noise, a modulation type such as 16-psk (16 phase shift keying) or higher modulation rate can be utilized to achieve higher data transfer rates. Even higher data transfer rates can be achieved by allocating more data channels to a particular user and transmitting data payload information over multiple parallel channels. Of course, finite channel resources can be judiciously allocated for use by multiple receiver units in order to optimize use of the wireless communication system since multiple users can potentially demand simultaneous use of the shared wireless data channels at any given time.

One application of the inventive wireless communication system is a shared forward link channel between a base station and multiple receivers in a CDMA (Code Division Multiple Access) communication system. Data blocks presented to a base station transmitter unit for transmission to a corresponding receiver are initially repackaged into manageably sized sub-blocks. Thereafter, the sub-blocks of digital information can be encoded into a payload portion of one or multiple data packets. The encoded data packets are then sent over the time-slotted traffic channels, where they can be recombined at a target receiver to recapture an original data block of information.

In a specific application, each receiver unit allocated use of a particular data channel can decode the preamble of a data packet to retrieve optionally included address information indicating to which receiver a data packet is directed. If the information in the preamble indicates that the data packet is directed to a corresponding receiver, a data payload of the data packet can be demodulated and decoded at that particular target receiver while other receivers, to which the data packet is not directed, can ignore the balance of the data packet. That is, non-target receivers need not decode the data payload portion of a data packet.

Typically, the modulation-type and encoding of data in the preamble of a data packet is based on a selected standard so that all receivers can decode and process the information to determine if a data packet is directed to a corresponding receiver. If so, the data payload of a data packet is decoded based on additional information also incorporated in the preamble. For example, a preamble can include information indicating a type of modulation used in the transmission of the data payload. This allows a data packet to be transmitted using different modulation types. For example, a first portion of a data packet such as the preamble can be modulated at one rate while a second portion of the data packet such as the data payload can be modulated at a different rate. Thus, one aspect of the present invention involves modulating one portion of data packets at first modulation rate while a second portion of the data packet is modulated at a different modulation rate.

Based on other aspects of the present invention, a data payload of a data packet can be encoded using a unique forward error correction code and code sequence spreading factor. These characteristics of a data payload also can be included in the preamble of a corresponding data packet so that a target receiver can recapture raw data associated with the data packet immediately after processing the preamble. That is, a target receiver knowing that a data packet is directed to itself can set up its hardware to receive, demodulate and decode a corresponding data payload of a data packet based on information in the preamble. Similar to the selection of a modulation type to be used in a transmission of the data payload, a forward error correction code and spreading factor also can be selected so that use of the wireless communication system is optimized for multiple users.

Since one aspect of the present invention involves transmitting data packets in time-slots of a shared traffic channel, the corresponding receivers are preferably synchronized with the base station so that each receiver can properly decode a data field such as a preamble or first portion of a received data packet. For example, a receiver can demodulate and decode data packets received in a time-slot to retrieve and monitor a preamble of a data packet.

Generally, aspects of the present invention can be used individually or combined to exploit its advantages over the prior art. When an address is included in the preamble, a potential target receiver can be allocated use of multiple traffic channels in which data is transmitted on an as-needed basis without the need for explicitly assigning particular time-slots to a target receiver well in advance of transmitting any data packets to the target receiver. Instead, time-slot assignment information such as a target address can be incorporated into a preamble of a data packet. For example, a preamble of a data packet can include an address to which a data packet is directed. Therefore, the overhead associated with dynamic assignment and de-assignment of time slots to specific receivers as suggested by previous methods is eliminated. Specifically, there is no longer a need to transmit time slot assignment or de-assignment information on separate data channels as the preamble of a data packet includes information indicating to which receiver a data packet is directed. Thus, there is no longer a latency associated with assigning time-slots that would otherwise potentially reduce the effective service rate afforded to a particular end user.

Additionally, the method of providing a preamble including information associated with a data packet works especially well in situations where multiple users share the use of multiple data channels to support high speed data transfer bursts. More specifically, certain principles of the present invention can be advantageously employed in shared access systems such as those incorporating Code Division Multiple Access (CDMA) techniques. A data payload of a corresponding data packet in these and similar applications can be modulated onto a traffic channel at a different rate than a rate used in modulation of the corresponding preamble. In other words, a transmission rate of the data payload can be variable and optimized depending on operating parameters of the communication system. Thus, the communication system of the present invention can respond more quickly to the throughput demands of end users, e.g., data can be modulated so that a particular data payload of a data packet has a very high data rate for high speed data transfers or lower data rates so that multiple users can share especially noisy data channels. Consequently, aspects of the present invention render it possible to optimize use of a limited wireless bandwidth susceptible to increasing demand by an ever-growing population of wireless users.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
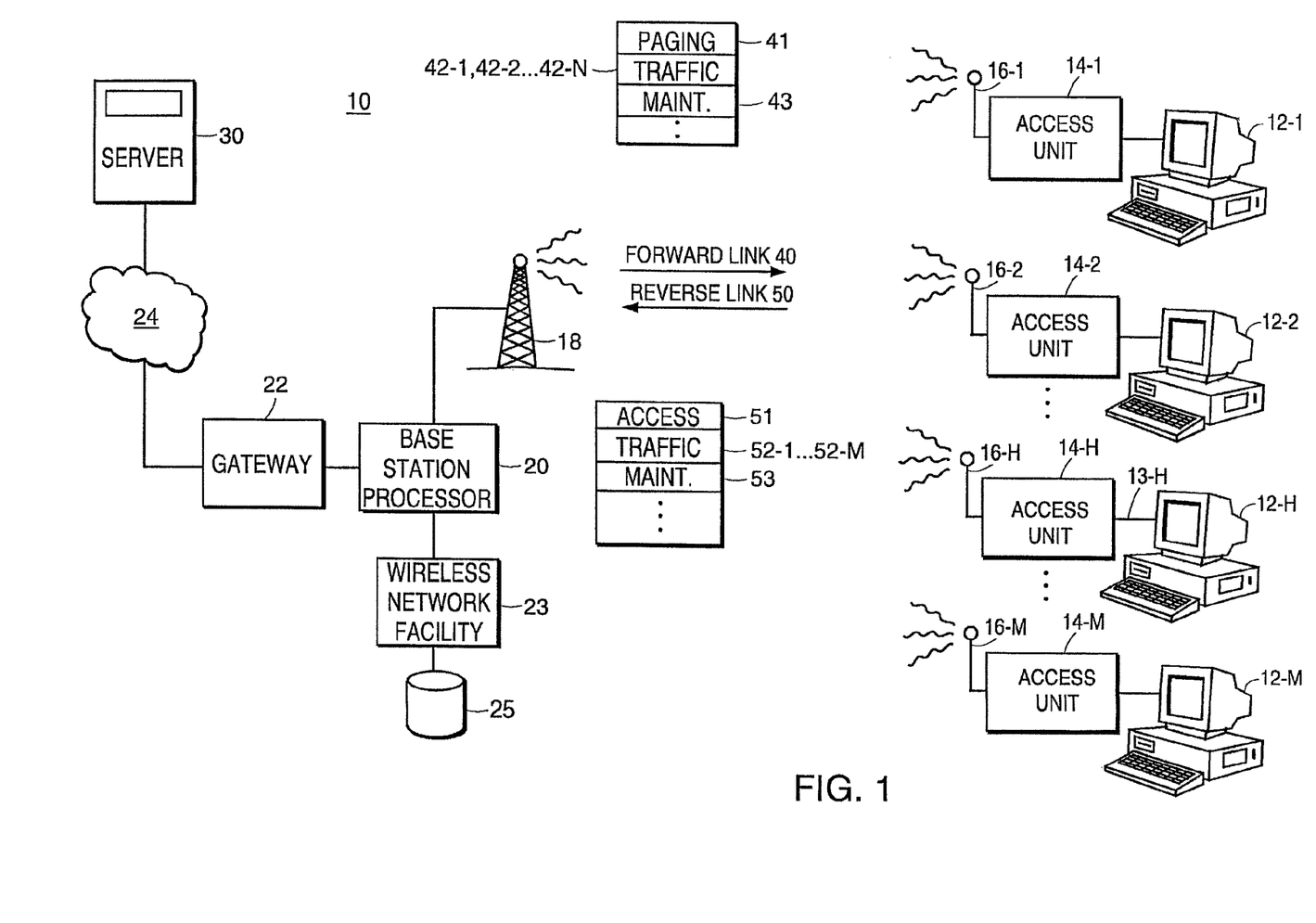
FIG. 1 is a block diagram of a communication system in which data is transmitted to target receivers over one or multiple shared time-slotted data channels according to certain principles of the present invention.

FIG. 1 is a block diagram illustrating a communication system 10 supporting the transmission of data to a user on an as-needed basis over multiple allocated data channels. In one application, data packets are generally transmitted in time-slots of allocated data channels to corresponding target receivers, without the need for explicitly assigning particular time-slots to a target user well in advance of transmitting any data packets. Instead, a data packet transmitted in a time-slot can include a header label or preamble indicating to which of multiple possible receivers a data packet is directed. The preamble also can include information indicating how a corresponding data payload of the data packet is to be processed for recapturing transmitted raw data.

According to the following description, communication system 10 is generally described as a wireless communication link such as a CDMA (Code Division Multiple Access) radio channel utilizing shared channel resources. However, it should be noted that the techniques described herein can be applied in other applications supporting shared access. For example, the principles of the present invention can be applied to other types of media such as telephone connections, computer network connections, cable connections, or other physical media to which allocation of resources such as data channels are granted on an as needed basis.

As shown, communication system 10 can include a number of Personal Computer (PC) devices 12-1, 12-2, . . . 12-h, . . . 12-m, corresponding Subscriber Access Units (SAUs) 14-1, 14-2, . . . 14-h, . . . 14-m, and associated antennas 16-1, 16-2, . . . 16-h, . . . 16-m. Centrally located equipment can include a base station antenna 18, and a corresponding base station processor 20.

Base station processor 20 generally provides connections to and from a network gateway 22, network 24 such as the Internet, and network file server 30.

Communication system 10 is preferably a demand access, point to multi-point wireless communication system such that PC devices 12 can transmit data to and receive data from network server 30 through bi-directional wireless connections implemented over forward link 40 and reverse link 50. That is, in the point to multi-point multiple access wireless communication system 10 as shown, a given base station processor 20 typically supports communication with a number of different subscriber or access units 14 in a manner which is similar to a cellular telephone communication network. Accordingly, system 10 can provide a framework for a CDMA wireless communication system where digital information is relayed on-demand between multiple mobile cellular users PC devices 12 and a hardwired network 24 such as the Internet.

PC devices 12 are typically laptop computers, handheld units, Internet-enabled cellular telephones, Personal Digital Assistant (PDA)-type computers, digital processors or other end user devices. Typically, each PC device 12 is connected to a respective access unit 14 through a suitable hardwired connection such as an Ethernet-type cable.

Each access unit 14 generally permits its associated PC device 12 access to network file server 30. In a reverse link 50 direction, that is, for data traffic traveling from a device PC 12 towards server 30, PC device 12 transmits a packet such as an Internet Protocol (IP) level packet to the access unit 14. Access unit 14 then encapsulates the wired framing (i.e., Ethernet framing) with appropriate wireless connection framing. The appropriately formatted wireless data packet then travels between antennas 16 and 18 over one of multiple radio channels that comprise reverse link 50.

At a central base station location, the base station processor 20 then extracts the radio link framed data packets and reformats the packets into an IP format. The packets are then routed through gateway 22 and any number or type of networks 24 to an ultimate destination such as a network file server 30. In one application, information generated by PC device 12 is based on a TCP/IP protocol. Consequently, a PC device 12 has access to digital information such as web pages available on the Internet. It should be noted that any type of digital information can be transmitted over channels of communication system 10 based on certain principles of the present invention.

Data can also be transmitted from network file server 30 to PC devices 12 on a logical connection including forward link 40. In this instance, network data such as an Internet Protocol (IP) packets originating at file server 30 can travel on network 24 through the gateway 22 to eventually arrive at base station processor 20. Appropriate wireless protocol framing is then added to raw data such as IP packets for communication of the packets over wireless forward link 40. The newly framed packets then transmitted through antenna 18 and to antenna 16 to the intended receiver access unit 14. An appropriate target receiver access unit 14 decodes the wireless packet formatting layer, and forwards the packet or data packets to the intended PC device 12 that performs IP layer processing.

A given PC device 12 and file server 30 therefore can be viewed as end points of a duplex connection at the IP level. More specifically, communication system 10 can provide logical connections between server 30 and a remote device such as PC 12. Once a logical connection is established between the base station processor 20 and corresponding access unit 14, a user at PC device 12 may then transmit data to and receive data from the file server 30 on an as-needed basis via a corresponding logical connection.

As will be described in greater detail later, reverse link 50 optionally includes different types of logical and/or physical radio channels such as an access channel 51, multiple traffic channels 52-1, . . . 52-t, and a maintenance channel 53. Reverse link access channel 51 is typically used by access units 14 to send messages to base station processor 20 indicating a request that traffic channels be granted to them. For example, traffic channels carrying data packets can be assigned to a user on an as-needed basis at a request of an access unit 14. The assigned traffic channels 52 then carry payload data from access unit 14 to base station processor 20. Notably, a given logical connection can have more than one traffic channel 52 assigned for use.

Maintenance channel 53 can also carry information such as synchronization and power control messages to further support transmission of information over both reverse link 50 and forward link 40.

In a similar manner, forward link 40 can include paging channel 41, which is used by base station processor 20 to inform access unit 14 of general information such as that one or multiple forward link traffic channels 52 have been allocated to it for the transmission of data. Additionally, paging channel 41 can be used to inform access unit 14 of allocated traffic channels 52 in the reverse link direction. Once assigned, traffic channels 42-1 . . . 42-n on the forward link 40 are then used to carry payload information from base station processor 20 to access units 14. Additionally, maintenance channels 53 can carry synchronization and power control information on forward link 40 from base station processor 20 to access units 14.

Additional information concerning a method of implementing multiple forward link and reverse link channels is provided in Patent Cooperation Treaty Application No. WO99/63682 entitled "Fast Acquisition Of Traffic Channels For A Highly Variable Data Rate," assigned to Tantivy Communications, Inc. and published Dec. 9, 1999.

Traffic channels 42 on forward link 40 can be shared in a Time Division Multiplex scheme among multiple access units 14. Specifically, a typical forward link traffic channel 42 can be partitioned into a predetermined number of periodically repeating time slots for transmission of data packets to multiple access units 14.

Figure 2:
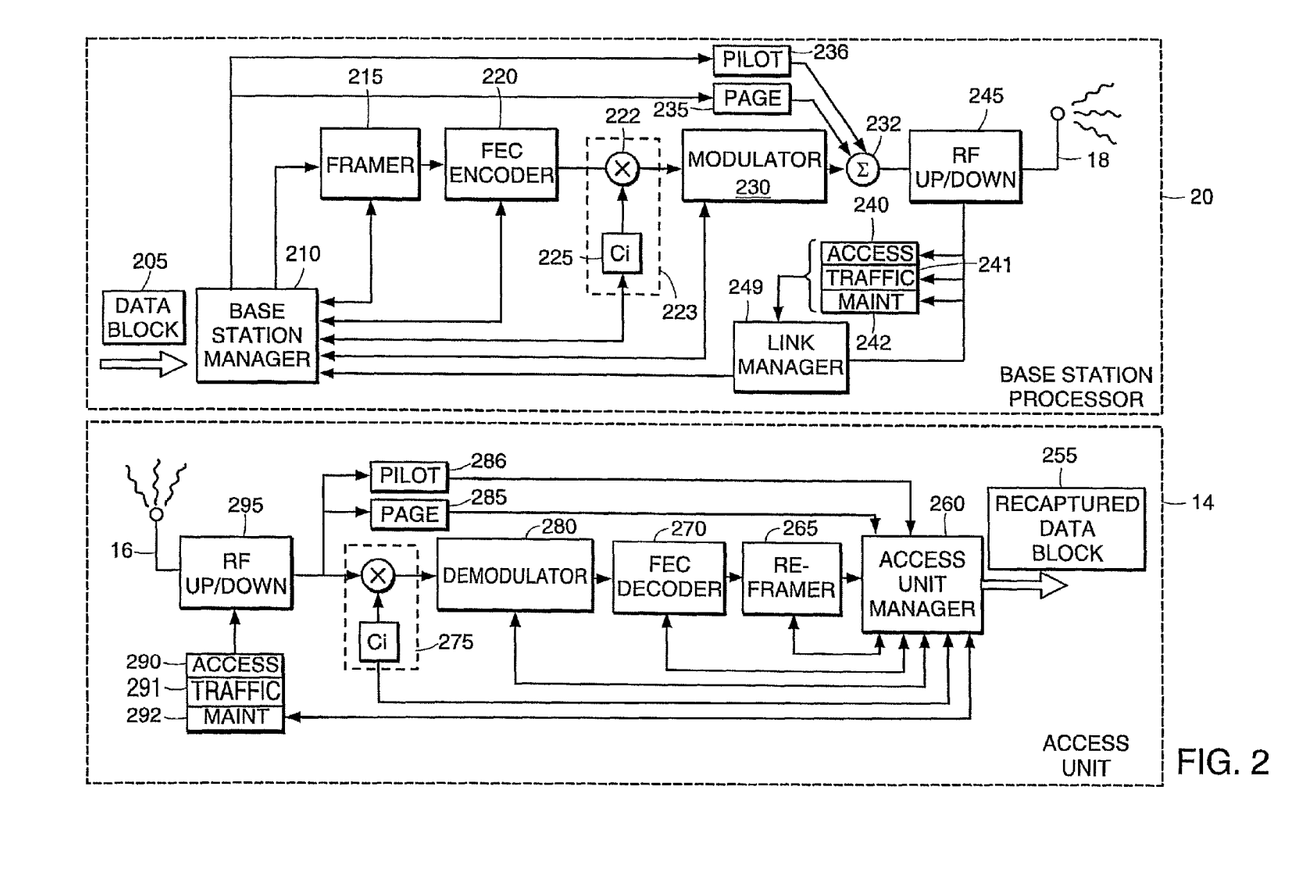
FIG. 2 is a block diagram illustrating components of a base station processor and corresponding target receiver access unit according to certain principles of the present invention.

FIG. 2 is a block diagram illustrating a combination of hardware and software components for supporting a data block transfer over a wireless link according to the principles of the present invention.

As shown, data block 205 is presented to base station manager 210 for transmission over wireless communication system 10. In one application, data block 205 comprises digital data transmitted by server 30 through network 24 and gateway 22 to base station processor 20. Generally, data block 205 is routed to base station processor 20 for transmission to a target receiver access unit 14 of communication system 10.

As previously mentioned, data block 205 can be a block of TCP/IP data packets encapsulating, for example, web page information bound for a target receiver access unit 14. It should be noted that portions of data block 205 can be transmitted over the data channels to a target receiver even though only a portion of the data block 205 is actually received at base station processor 20. More specifically, parts of a data block can be transmitted over the wireless channels as portions of a data block 205 are received at base station 20.

In some instances it is undesirable to transmit an entire data block in a serial manner over a single dedicated traffic channel. Such a technique can be ineffective for transmitting data if the throughput rate of the traffic channel link is low and the block of data to be transmitted is very large. It is sometimes preferable to transmit relatively large blocks of data in as little time possible while still making efficient use of wireless communication system 10. Thus, multiple traffic channels according to certain principles of the present invention can be allocated for use by a particular access unit 14 for high-speed data transfers from base station processor 20 to a target receiver access unit 14.

Data block 205 can be reduced into manageable chunks for piecewise transmission over multiple channels to a target receiver access unit 14. If only a single channel were utilized for such a data transfer as mentioned, large data blocks 205 might otherwise be slowed by a bottleneck on a single channel unable to support a high throughput.

Data block 205 is presented to framer 215 that can optimally reduce the size of data block 205 by dividing it into sub-packets or sub-blocks of data based on operating parameters of communication system 10. A number of bytes transmitted in each frame is not of particular importance to the present invention since the optimal division of a data block depends on many parameters of communication system 10. These will be discussed in more detail later in this specification.

In any event, framed data is fed to forward error correction (FEC) encoder 220. Generally, FEC encoder 220 adds information to the framed data to permit error detection at the receiver 14. This optional forward error correction encoding ensures that data is accurately received at a target receiver access unit 14. Any number of FEC encoding types can be used such as BCH codes, block codes, turbo codes, turbo product codes and the like.

More details regarding forward error correction coding can be found in pending U.S. application Ser. No. 09/447,022 entitled "Variable Rate Coding for Forward Link" filed on Nov. 22, 1999, the entire teachings of which are incorporated herein by this reference.

An FEC encoded frame is then forwarded from FEC encoder 220 to cover sequence circuit 223 that applies a cover sequence, Ci, corresponding to a traffic channel over which the data is to be transmitted. The cover sequence circuit 223 typically comprises code generator 225 and mixer 222.

Generally cover sequence Ci can be any suitable sequence. One class of such sequence is a long pseudo-random noise (PN) code. In this instance, a cover sequence is applied by modulo-2 multiplication of the cover sequence Ci with FEC encoded frame data. A cover sequence can also be other near-orthogonal sequences that scramble encoded data. Preferably, a cover sequence will scramble the data sufficiently and cause an FEC decoder to fail in the decoding process if an incorrect cover sequence is applied at a receiver such as access unit 14. This ensures separation of traffic channels such as those supported in a code division multiple access (CDMA) communication system.

The output of cover sequence circuitry 223 is fed to modulator 230. A modulation type is impressed upon this signal at modulator 230 as selected by base station manager 210. Modulation types can be any suitable type such as BPSK (binary phase shift keying), QPSK (quadrature phase shift keying), 8-psk, up to n-psk. A type of modulation to be used in the transmission of a data packet 305 depends on operating parameters of the wireless communication system 10.

Modulated signals are fed to summer circuit 232. In addition to the modulated traffic channel as previously discussed, information on a pilot channel 236 and paging channel 235 are fed to summer circuit 232. RF up/down converter 245 is then used to transmit the information over wireless channels via antenna 18.

It should be noted that components of base station processor 20 are optionally duplicated to support the generation of multiple traffic or paging channels. According to one aspect of the present invention as mentioned, multiple traffic channels are generated at base station processor 20 to carry sub-blocks of data block 205 to a target receiver access unit 14.

Figure 3:
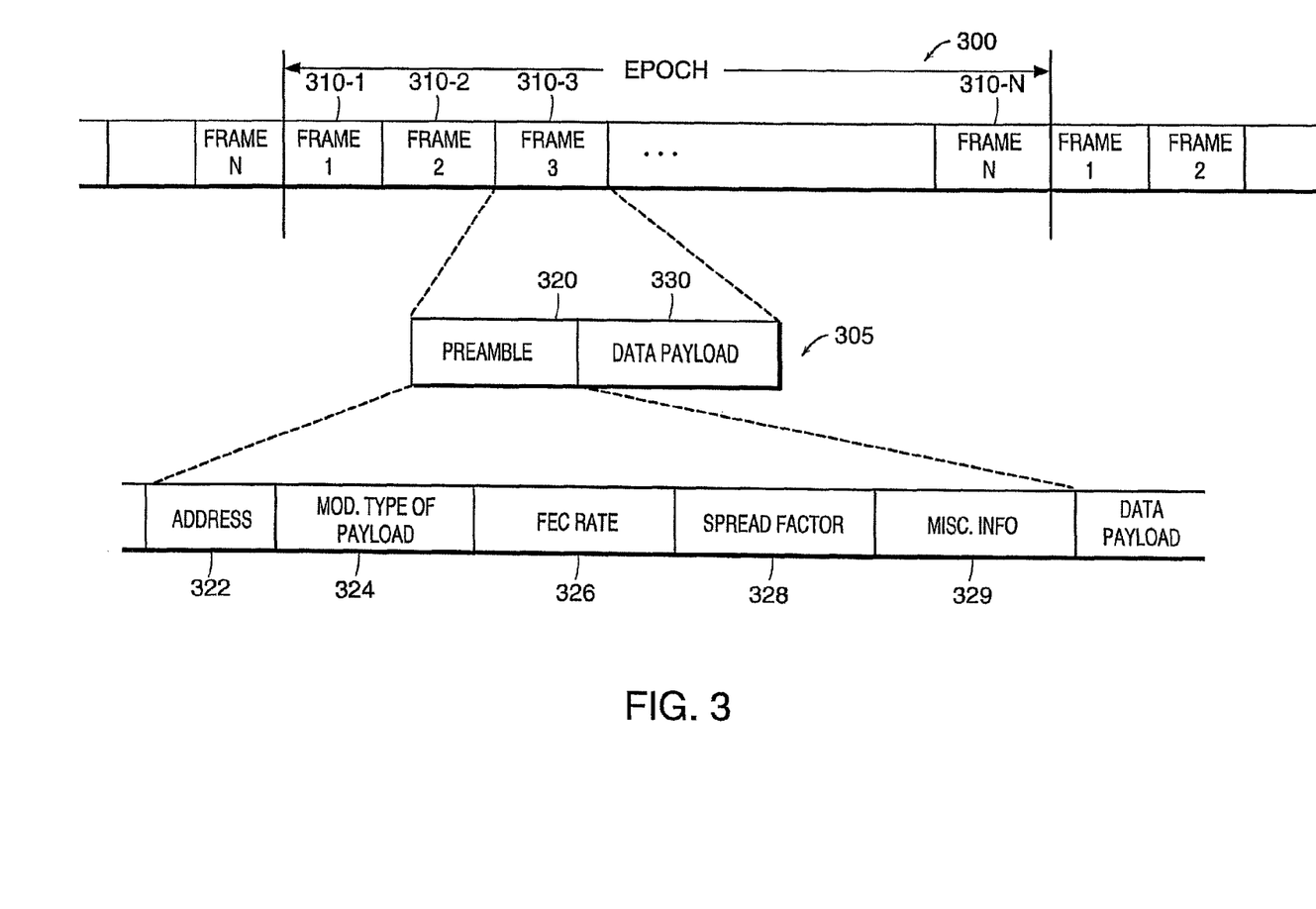
FIG. 3 is a diagram illustrating a time-slotted data channel and corresponding format for transmitting data packets on a traffic channel according to certain principles of the present invention.

FIG. 3 is a diagram illustrating a traffic channel according to certain principles of the present invention. As shown, forward link traffic channel 300 includes a cycle or Epoch of repeating time slots 310-1, 310-2, ..., 310-n. In one application, each time slot is 13.33 mS (milliseconds) in duration and 30 consecutive times slots form a cycle of 400 mS. Thus, an Epoch can include 30 times slots. As previously discussed, sub-blocks of data block 205 can be transmitted in corresponding data payloads 330 of data packets 305 transmitted in time slots 310.

In addition to data payload 330, each data packet 305 can include a preamble 320 or header label. Preamble 320 includes information associated with a corresponding data payload 330. This information is encoded into a data packet 305 by base station processor 20 that generates the data packets as previously discussed.

Preamble 320 can include information indicating to which of multiple possible receiver access units 14 a data packet is directed. This enables multiple access units 14 to monitor a common traffic channel 300 and receive and decode data packets directed to them.

It is preferred that preamble 320 of each data packet 305 is transmitted using a common format so that access units 14 assigned use of a data channel can properly decode the preamble of each data packet 305. For example, base station processor 20 transmits the preamble information using a specified modulation type and FEC code depending on system parameters. Address 322 indicating to which access unit 14 a data packet 305 is directed is preferably located at the beginning of preamble 320. Consequently, a receiver access unit 14 monitoring a traffic channel needs only to decode address 322, or a preamble 320 of minimal duration such as 2 mS of a data packet 305, to determine a target destination of a data packet 305.

If the data packet 305 is not directed to a given receiver access unit 14, access unit 14 typically does not need to decode and demodulate the balance of the data packet 305, i.e., the data payload 330 portion of the data packet 305. This can result in an overall power savings because an entire data packet 305 is not needlessly demodulated or decoded at a non-target receiver access unit 14.

Preamble 320 can include additional information indicating characteristics of a corresponding data payload 305. For example, information concerning a modulation type 324 of a data payload 330 following preamble 320 can be provided so that a receiver access unit 14 can demodulate the data payload 330 accordingly. Notably, this aspect of the present invention renders it possible to modulate a preamble 320 independent of a corresponding data payload 330. In other words, a preamble 320 can be modulated at a same or different rate than a corresponding data payload 330 of a data packet 305. The modulation type of data payload 330 can vary depending on throughput parameters of communication system 10.

In addition to encoding a modulation type of a corresponding data payload 330, preamble 320 can include information such as an FEC (forward error correction) code 326 and spreading factor 328 used in a transmission of a corresponding data payload 330. These parameters can vary from data packet to data packet.

In certain applications, miscellaneous information 329 is optionally included in a preamble 320 or header label of a data packet 305. This information can be, for example, one or multiple 'continuation' bits indicating that certain data packets 305 transmitted in following time slots 310 are also directed to a particular receiver access unit 14. For example, a particular data bit set to a logic 1 can indicate that a following time slot includes a data payload 330 for the same target access unit 14 as a present message being decoded. Additionally, a preamble 320 can include a sequence of bit information indicating which of multiple following data packets 305 are directed to a target receiver. Accordingly, a non-target receiver access unit 14 does not need to monitor data packets 305 transmitted in certain time slots 310. Conversely, a target receiver access unit 14 identifying the target address of a data packet 305 as its own knows to demodulate and decode information in certain time slots 310. Other relevant messages for a receiver can be transmitted in the miscellaneous information 329 data field of preamble 320.

The channel format as illustrated in FIG. 3 is beneficial because it affords flexible use of data channels and corresponding time slots 310. For example, time slots 310 can be effectively assigned for almost instantaneous use by a target receiver access unit 14 when an address 322 is included in preamble 320 indicating to which target receiver access unit 14 a data packet 305 is directed and how a data payload is to be further processed.

Another benefit of formatting data packets as previously discussed stems from encoding additional information in the preamble 320 of a data packet 305 to indicate how data packets transmitted on a wireless channel are encoded and modulated. Based on this feature of the present invention, base station processor 20 can optimally transmit data and redefine a use of the channels almost immediately to optimize use of channel resources according to present operating conditions of communication system 10. This flexibility is particularly useful in applications where parameters such as environmental operating conditions of communication system 10 can change without advanced notice.

Consider that an unexpected RF burst can cause a signal-to-noise ratio to suddenly increase for a particular channel. According to certain principles of the present invention, modulation and encoding of data packets 305, i.e., use of channel resources, can be changed almost immediately based on the new operating parameter of communication system 10 with little or no loss of data due to corruption. More specifically, a type of modulation and encoding can be immediately adjusted so that data is transmitted at an optimal rate and a target receiver properly receives data.

Methods as suggested by the prior art typically result in loss of data because a receiver assigned use of a time slot 310 expects to receive modulated and encoded data based on a pre-known fixed setting. The latency associated with notifying an assigned receiver unit of a new modulation or encoding type can ultimately result in a loss of data, especially in situations where data is transmitted at a high modulation rate and the environment suddenly becomes very noisy. For example, sudden burst of noise can cause interference so that raw data cannot be demodulated by a target receiver.

Referring again to FIG. 2, access unit 14 can include hardware and software components for receiving data transmitted from base station processor 20. Antenna 16 receives wireless signals that are then processed by RF up/down converter 295.

Typically, multiple assigned traffic channels are monitored for data packets 305 directed to a corresponding access unit 14.

Each access unit 14 preferably includes a cover sequence circuit 275, a demodulator 280, an FEC decoder 270, are-framer 265 and an access unit manager 260. This combination of components is generally used to monitor, receive, demodulate, and decode data packets 305 of a particular traffic channel. As shown, the signal generated from cover sequence circuit 275 is fed to demodulator 280 where it is demodulated according to a type of modulation used in transmission of corresponding data packets 305. FEC decoder 270 is then used to verify that the signal was properly received according to a forward error correction code. Finally, re-framer 265 processes a data packet 305 for recapturing sub-blocks or raw data of a received portion of an original data block 205. Received sub-blocks are recombined at access unit manager 260 to produce recaptured data block 255. In applications supporting the transfer of IP data packets, the raw data is forwarded to a corresponding PC device 12 for appropriate processing as it is retrieved.

As data packets 305 are received by an access unit 14, access unit manager 260 processes the received preamble 320 of data packets 305 to determine to which access unit 255 it is directed. Based on information in preamble 320, access unit manager 260 coordinates the processing and decoding of data packets 305. More specifically, access unit manager 260 demodulates, decodes and reframes a data payload 330 of a data packet 305 based on information in the preamble 320 to retrieve any raw data if the data packet 305 is directed to a given access unit 14.

Figure 4:
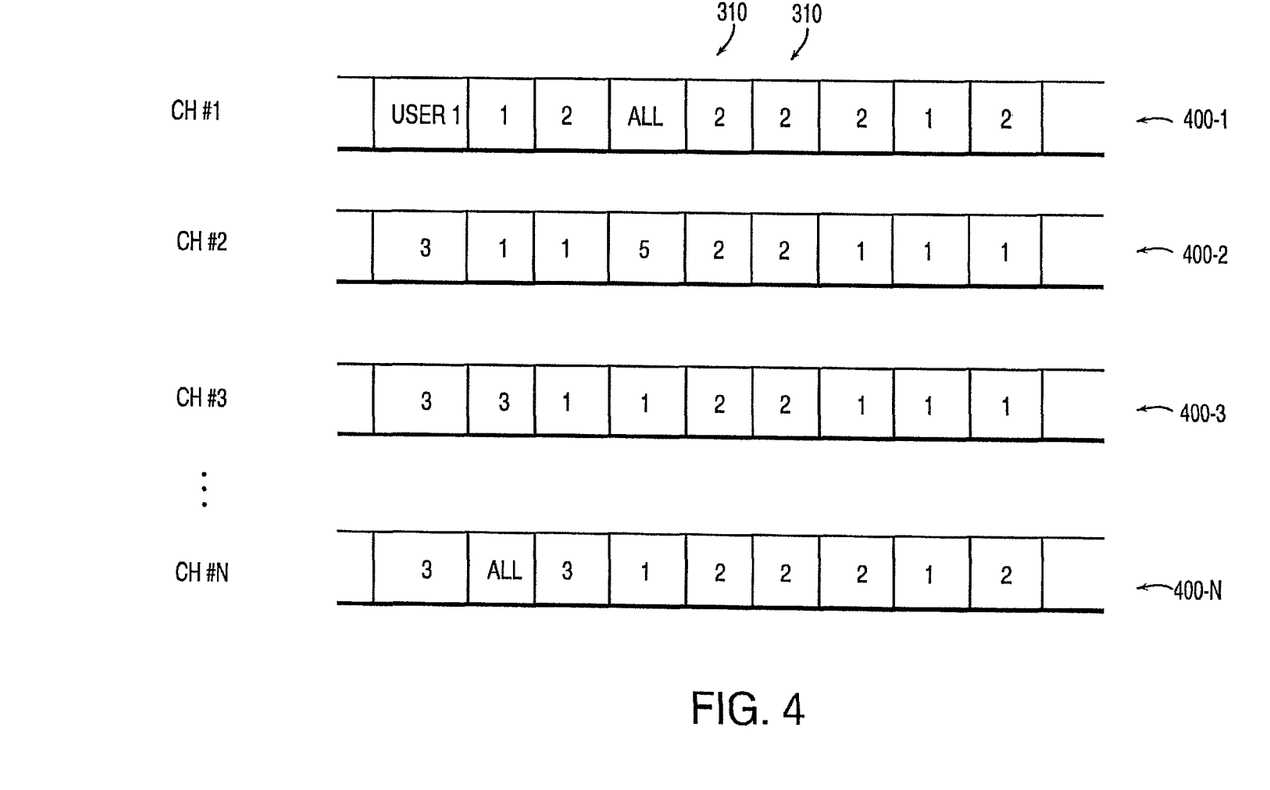
FIG. 4 is a diagram illustrating a transmission of data packets in multiple time-slots of multiple channels according to certain principles of the present invention.

FIG. 4 is a diagram illustrating a transmission of data packets m multiple time slots of multiple channels according to certain principles of the present invention. As previously discussed, one aspect of the present invention concerns rapidly transmitting bursts of data to a corresponding target receiver access unit 14. This can be achieved in part by assigning or allocating multiple traffic channels 400 for use by a receiver. Consequently, multiple data packets 305 can be transmitted to an access unit 14 over multiple traffic channels 400, reducing an overall amount of time to transmit a data block 205 from base station processor 20 to an access unit 14. FIG. 4 illustrates this concept as multiple data packets 305 are transmitted over multiple time-slotted traffic channels 400-1, 400-2, . . . , 400-n. A subset or all of these traffic channels can be assigned to an access unit for use.

It should be noted that certain data packets 305 are optionally transmitted to all access units assigned to a traffic channel. For example, base station 20 can transmit a universal message to all receivers. In this way, a base station processor 20 can transmit general information messages to multiple users at the same time.

As shown, time slots 310 of each traffic channel can include a data packet directed to a particular target receiver access unit 14. A numeral in a time slot 310 indicates an address 322 of the receiver access unit 14 to which a data packet 305 is directed.

Multiple traffic channels 400 are typically shared so that more than one data block 205 can be transmitted to a different target receiver access unit 14 at any given time. In such a situation, base station processor 20 must determine at what rate the data payload 330 of a data packet 305 will be transmitted, including a modulation type, forward error correction coding and a spreading factor used in transmission of such data. Thus, based on these principles, data packets 305 transmitted in different time slots 310 of a traffic channel 400 can be transmitted at different rates even though a length of a time slot 310 is constant. Consequently, higher data transmission rates render it possible to reduce the overall time necessary to transmit an entire data block 205 to a target receiver access unit 14.

Generally, the data transmission rate of sub-blocks presented in a data payload 330 of a data packet 305 depend on observed link parameters. For example, factors that are used to determine a bit transmission rate for a given data packet 305 include the signal-to-noise ratio (SNR), bit error rate (BER), a subscription type afforded to a user, and multipath distortion of a corresponding traffic channel. These and other parameters can be measured at either base station processor 20 or target receiver access unit 14 to determine an appropriate modulation type, forward error correction code and a spreading factor used in transmitting a particular data packet 305.

Figure 5:
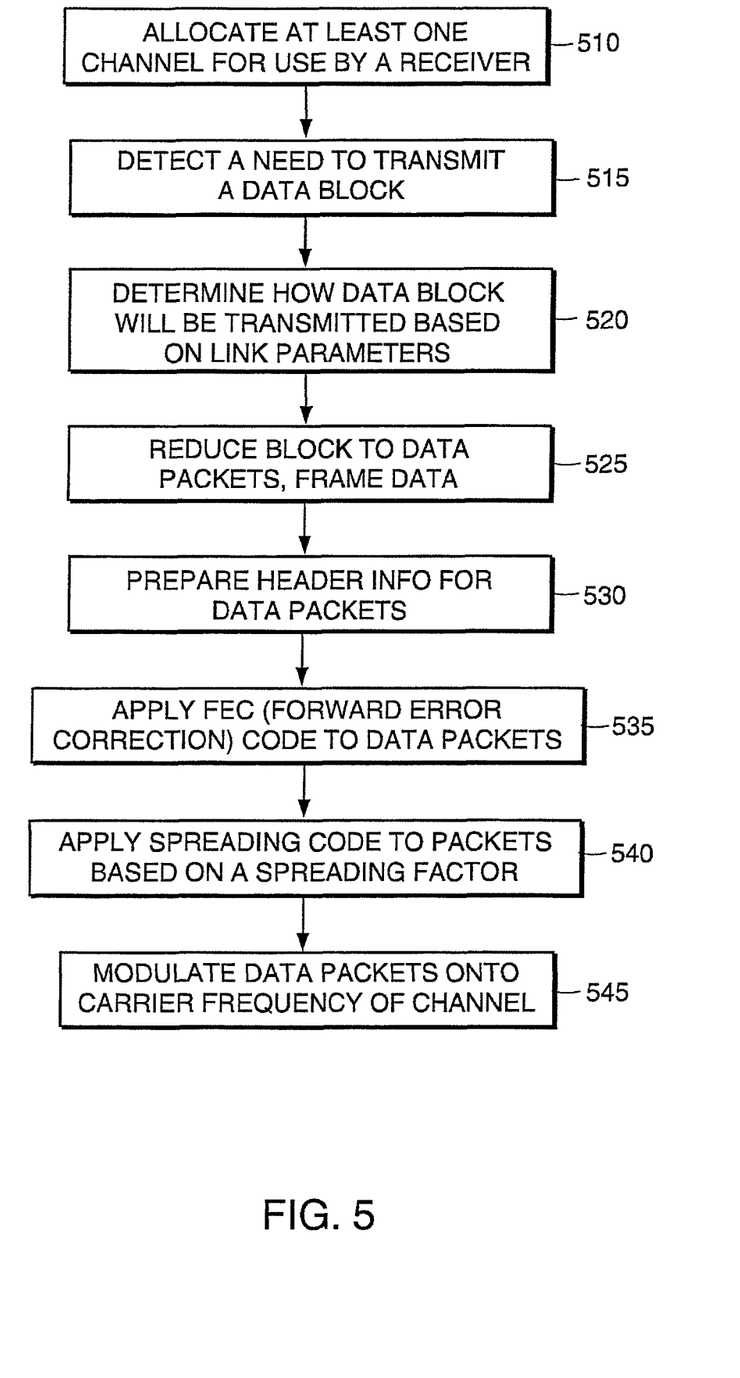
FIG. 5 IS a flow chart illustrating a method of processing and transmitting data information to a target receiver according to certain principles of the present invention.

FIG. 5 is a flow chart illustrating a method of processing a data block 205, or portion thereof, for transmission to a target receiver access unit 14 according to certain principles of the present invention.

In step 510, a receiver access unit 14 can be allocated or assigned at least one traffic channel upon which data packets 305 will be transmitted to the receiver. As mentioned, the number of traffic channels assigned to each of multiple possible receivers depends on factors such as required throughput and a subscription plan purchased by a corresponding user. For example, subscription plans can be structured so that more channels are assigned for users that pay higher fees. Likewise, more channels or throughput capability can be allocated to a user if it is anticipated that there will be a need for higher data throughput and such resources are available.

Step 515 involves detecting a need at base station processor 20 to transfer a data block 205 over selected channels of wireless communication system 10 to a target receiver access unit 14. In one application, data block 205 is web page information transmitted to a particular target receiver access unit 14.

In step 520, base station processor 20 determines how a data block will be transmitted to a target receiver access unit 14. As previously discussed, multiple factors are typically considered. For example, the signal-to-noise ratio, bit error rate, multipath distortion, and subscription plan, among other relevant factors, can be considered for transmitting data packets 305. These parameters are generally tracked and processed by link manager 249. Notably, access units 14 can include sensor circuitry and other processing devices that measure link quality and determine how to optimize resources of wireless communication system 10. An optimal forward error correction code and a spreading factor of the PN code defining a particular traffic channel can also be selected by link manager 249.

Data block 205 is typically reduced to sub-blocks that are transmitted in data payloads 330 of multiple data packets 305 in step 525. Encoding of data payload 330 and preamble 320 of a data packet 305 is discussed in the following steps.

A header label or preamble 320 is generated in step 530 for each of the data packets 305. As previously mentioned, preamble 320 can include: an address 322 indicating to which target receiver access unit 14 a data packet 305 is directed, information regarding a modulation type of a corresponding data payload 330, a forward error correction code 326 used to encode a sub-block into a data payload 320, and a spreading factor 328 to be used in transmission of the data payload 320. These same parameters must be addressed for generating the preamble 320 of a data packet 305 since all assigned potential target receiver access units 14 must decode the preamble 320 of a data packet 305 to determine to which device it is directed.

Standard encoding and modulation type known by all receivers can be used to generate a preamble 320 of a data packet 330. Thus, all receiver access units 14 assigned to a particular traffic channel are able to read a preamble 320 of a data packet 305.

Step 535 involves encoding sub-blocks based on a selected forward error correction code. In one embodiment, a data payload 330 has a fixed frame size including a predetermined number of symbols. A first portion of symbols are used for error correction codes while the balance of symbols are used to encode bit information of the sub-block to be transmitted in a corresponding data payload 330. Notably, some applications require a higher ratio of forward error correction code information relative to raw data information, reducing an overall transmission rate of data payload 330. More specifically, less symbols are available for representing bit information of a sub-block when more symbols are used for correction coding.

Optimal forward error correction coding, as mentioned, depends on parameters of wireless communication system 10. For example, more correction code information can be used to ensure a more accurate reception of data at a corresponding target receiver access unit 14. However, as mentioned, longer correction codes can result in a slower overall transmission rate of data. Thus, there is an optimal balance between both possible extremes of using too much or too little coding correction information.

Step 540 involves applying an appropriate spreading factor 328 to a framed data payload 330. The spreading factor is the ratio of PN codes of the cover sequence versus the number of data bits transmitted in a given window of time. An optimal spreading factor can be dynamically selected for a given data payload 330 as previously discussed. For instance, a spreading factor can vary from packet to packet.

Figure 6:
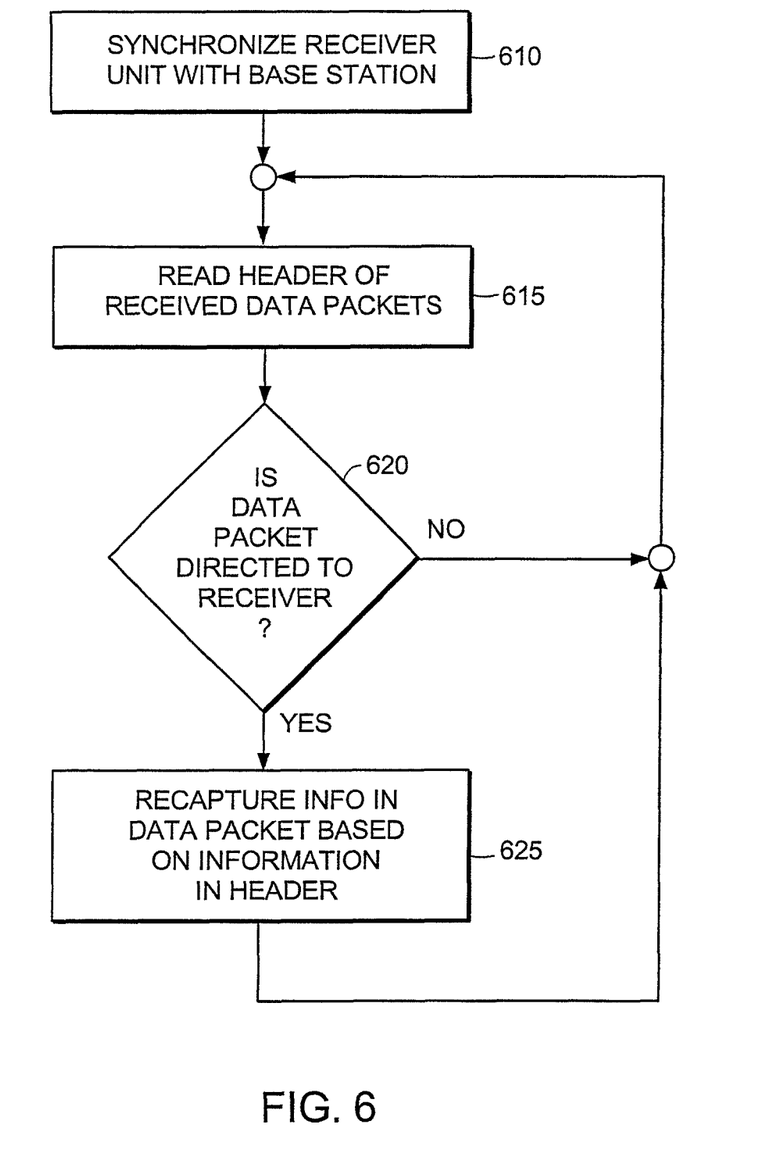
FIG. 6 is a flow chart illustrating a method of processing data packets at a receiver to recapture an original data block according to certain principles of the present invention.

Finally, in step 545, a data packet 305 is modulated onto a carry frequency in a corresponding time slot 310 of a traffic channel. Preamble 320 is preferably modulated using BPSK (binary phase shift keying) although any suitable modulation rate can be used. A corresponding data payload 330, however, is typically modulated according to information in the preamble 320 as previously discussed. FIG. 6 is a flow chart illustrating a method of processing data packets 305 at a receiver access unit 14 to recapture transmitted data according to certain principles of the present invention. In step 610, a receiver access unit 14 can be synchronized with base station processor 20 so that it is able to receive data packets 305 in time slots 310 of allocated traffic channels. Generally, this can be achieved by monitoring a forward link channel so that access units 14 are synchronized with base station 20. Synchronization information is optionally included in a data packet 305 so that a target receiver can decode a data packet 305 transmitted in a time slot 310.

As data packets 305 are received in each time slot 310 in step 615, preamble 320 is demodulated and decoded to determine an address 322 to which the data packet is directed. At this point, only preamble 320 of data packet 305 is demodulated and decoded. If it is determined in step 620 that a particular data packet 305 is not directed to a given monitoring receiver access unit 14, decoding or demodulation need not be performed on a data payload 330 of a corresponding data packet 330. This can reduce needless processing of the data payload 330 when it is not directed to a particular access unit 14.

On the other hand, if it is determined in step 620 that a data packet 305 is directed to a given monitoring receiver access unit 14, the information in preamble 320 is processed so that the hardware can be set for demodulating and decoding a corresponding data payload 330 of the data packet 305 in step 625. As discussed, data payloads 330 from multiple data packets 305 are typically combined to produce recaptured data block 255, which is essentially a duplicate of original data block 205 presented to base station processor 20.

Although the principles of the present invention have been illustrated using a forward link channel of a point-to-multipoint wireless communication system, these same principles can be exploited on a reverse link channel of communication system 10 or similar systems that share a use of channel resources.

Another embodiment of the present invention involves transmitting data packets over assigned traffic channels or assigned time slots of one or more traffic channels. For instance, a time slot 310 in an Epoch including multiple time slots 310 can be assigned to an access unit 14 for receiving data packets. In such an embodiment, it is not necessary to transmit address information in preamble 320 indicating to which access unit a data packet 305 is directed. Rather, an access unit 14 synchronized with base station 20 decodes and demodulates data packets 305 in assigned time slots 310. Consequently, a target receiver access unit 14 can determine which data packets 305 and, more particularly, which preambles must be demodulated and decoded.

One method of assigning use of time slots 310 involves transmitting such information to multiple access units 14 over a forward link channel such as a paging channel 41. Thus, a base station 20 can allocate and de-allocate use of one or more repeating time slots 310 depending on throughput requirements of a particular access unit 14. As previously discussed, a preamble 320 can provide information so that a target receiver can properly decode and demodulate a message. Accordingly, parameters of wireless system 10 can be monitored for optimally transmitting data since modulation rates can, thereafter, be changed almost instantaneously depending on conditions. In certain applications, a latency associated with allocating use of traffic channels 400 and time slots over a separate channel other than a preamble of a data packet 305 is tolerable.

While this invention has been particularly shown and described with references to preferred embodiments thereof, it will be understood by those skilled in the art that various changes in form and details may be made therein without departing from the scope of the invention encompassed by the appended claims.

What is claimed is:

1. An access unit for receiving a signal, said access unit comprising:
   a mobile phone receiver to receive said signal in a time slot of a shared channel, said signal comprising a control information portion and a payload data portion; and
   a processor to:
      determine, based on said control information portion, if said signal is directed to said receiver;
      demodulate said payload data portion using a modulation type indicated in said control information portion in response to determining that said signal is directed to said receiver; and
      determine a data rate for said payload data portion based on said control information portion.

2. The access unit of claim 1, wherein said control information portion is provided for a plurality of receivers.

3. The access unit of claim 1, wherein said payload data portion is provided for a plurality of receivers.

4. The access unit of claim 1, wherein said processor is further to combine said payload data portion of a plurality of said received signals to reconstruct a message.

5. The access unit of claim 1, wherein said modulation type is based on observed link quality parameters.

6. The access unit of claim 1, wherein said processor is further to decode said payload data portion according to an error correction code identified in said control information portion.

7. A base station for transmitting a signal, said base station comprising:
   a processor to allocate a time slot of a shared channel;
   said processor further to:
      generate said signal, wherein said signal comprises a control information portion and a payload data portion, said control information portion further comprising a modulation type and an indication of which of a plurality of receivers said payload data portion is directed; and
      include, in said control information portion, a data rate for said payload data portion;
   a modulator to modulate said signal using said modulation type; and
   a transmitter to transmit said signal in said allocated time slot.

8. The base station of claim 7, wherein said modulation type is based on observed link quality parameters.

9. The base station of claim 7, wherein said processor is further to include, in said control information portion, an error correction code for said payload data portion.

10. A method for receiving a signal, said method comprising:
    receiving said signal in a time slot of a shared channel, said signal comprising a control information portion and a payload data portion;
    determining, based on said control information portion, to which of a plurality of receivers said signal is directed;
    determining a data rate for said payload data portion based on said control information portion; and
    demodulating said payload data portion using a modulation type indicated in said control information portion in response to determining that said signal is directed to a selected one of said plurality of receivers.

11. The method of claim 10, further comprising combining said payload data portion of a plurality of said received signals to reconstruct a message.

12. The method of claim 10, wherein said modulation type is based on observed link quality parameters.

13. The method of claim 10, further comprising decoding said payload data portion according to an error correction code identified in said control information portion.

14. A computer-readable storage medium having instructions stored thereon which when executed by a processor result in the following operations comprising:
    receiving said signal in a time slot of a shared channel, said signal comprising a control information portion and a payload data portion;
    determining, based on said control information portion, to which of a plurality of receivers said signal is directed;
    determining a data rate for said payload data portion based on said control information portion; and
    demodulating said payload data portion using a modulation type indicated in said control information portion in response to determining that said signal is directed to a selected one of said plurality of receivers.

15. The computer-readable storage medium of claim 14, further comprising the operation of combining said payload data portion of a plurality of said received signals to reconstruct a message.

16. The computer-readable storage medium of claim 14, wherein said modulation type is based on observed link quality parameters.

17. The computer-readable storage medium of claim 14, further comprising the operation of decoding said payload data portion according to an error correction code identified in said control information portion.

* * * * *